No. 875,508. PATENTED DEC. 31, 1907.
A. DE LUIGI & C. RAMAZZOTTI.
AUTOMOBILE TRAIN.
APPLICATION FILED MAR. 22, 1906.
2 SHEETS—SHEET 1.
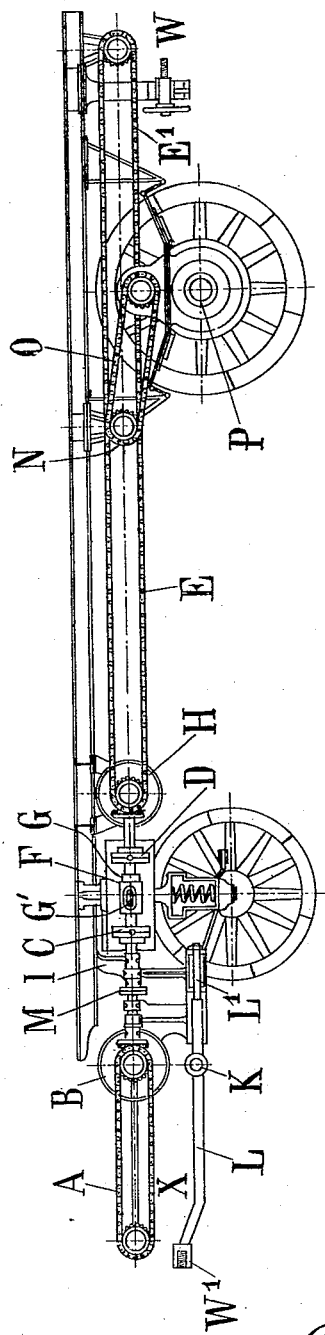

No. 875,508. PATENTED DEC. 31, 1907.
A. DE LUIGI & C. RAMAZZOTTI.
AUTOMOBILE TRAIN.
APPLICATION FILED MAR. 22, 1906.
2 SHEETS—SHEET 2.
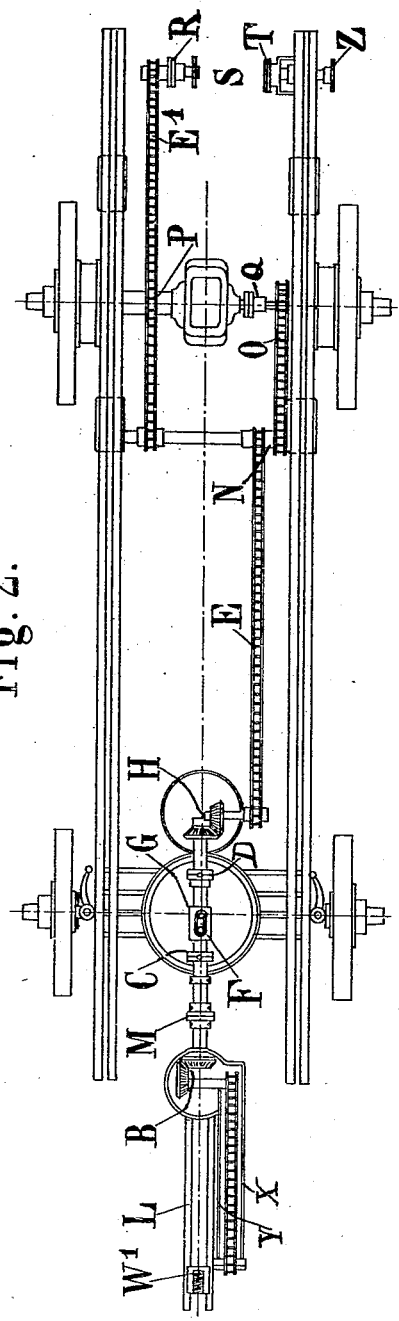
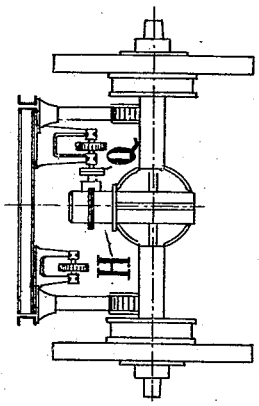
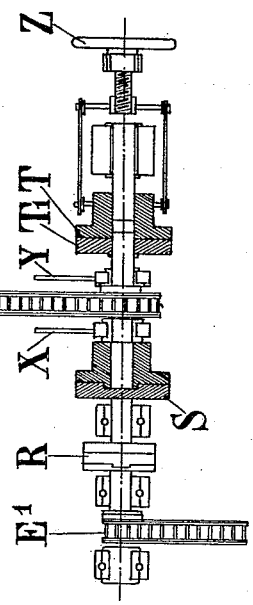
Witnesses.
Samuel Percival
Frederick Cleveland
Inventors
Angelo De Luigi
Carlo Ramazzotti
by Wheatley & MacKenzie
Attorneys.

UNITED STATES PATENT OFFICE.

ANGELO DE LUIGI AND CARLO RAMAZZOTTI, OF MILAN, ITALY.

AUTOMOBILE-TRAIN.

No. 875,508.  Specification of Letters Patent.  Patented Dec. 31, 1907.

Application filed March 22, 1906. Serial No. 307,763.

*To all whom it may concern:*

Be it known that we, ANGELO DE LUIGI and CARLO RAMAZZOTTI, subjects of the King of Italy, and residents of Milan, in the Province of Milan, Kingdom of Italy, have invented certain new and useful Improvements in Automobile-Trains, of which the following is a specification.

This invention relates to a device that can be applied to carriages of any kind for the purpose of forming an automobile train for traveling on ordinary roads.

In connection herewith the power furnished from one carriage of the train is transmitted to all the other carriages for the purpose of driving them, each of the carriages utilizing its part of the power and participating in the forward movement of the whole train, whereby the weight is considerably reduced and the movement is rendered more uniform than has been possible hitherto in traveling on rails.

In the accompanying drawing one form of the invention is illustrated:—

Figure 1 is a side elevation of a carriage furnished with the device; Figs. 2 and 3 being a plan and end elevation of the same respectively; and Fig. 4 illustrates details of the device for coupling two successive carriages together.

The chain A running from the back part of the frame of the first or any other carriage transmits the rotary motion by means of a chain-wheel gear to two Cardan couplings C and D which are arranged in the middle of the front part of the frame and in the longitudinal direction. Owing to the known properties of these couplings the uniformity of the motion is not interrupted when the train of carriages passes from a straight line to a curve. All that is essential is that the periodical changes of speed of the Cardan couplings shall be overcome and thereby the motion be kept uniform. For this purpose two such couplings are provided and connected together, so that whatever the curve may be the symmetrical axis of the two interior forks of the couplings form the same angle with the axis of the exterior forks. The device for connecting the two Cardan couplings consists substantially of a sleeve F and a cylindrical part G that slides therein in the manner of a piston. The sleeve F is firmly seated on the second fork of the Cardan coupling C, the cylinder G on the other hand on the first fork of the Cardan coupling D. On the cylindrical part G arranged at right angles to each other four pairs of pins G' are seated which slide freely in four openings in the sleeve F and enable it to carry the cylinder G along in its movement, but allow it to move longitudinally in the sleeve. These parts form the movable connection of the two inner forks of the two Cardan couplings. Of the outer forks, that belonging to the front coupling C is connected with the pair of bevel wheels B driven by the chain A, that belonging to the back coupling D being connected with the bevel gear wheel H that drives the chain E.

The whole system just described is so mounted in relation to the king bolt of the front part of the frame that while the one coupling D remains stationary the other can move in a horizontal plane, turning around a vertical axis, that coincides with the vertical axis of the fore-frame. This swinging motion is induced by the fork support I, the movements of which are dependent on the carriage-pole.

When the carriage or carriages move forwards in a straight line, the two Cardan couplings C and D, the telescopic connection F G between them and the two bevel wheel gears B and H are in a straight line, that coincides with the middle line of the carriage and the movement is effected as if the system were rigid. When a curve is negotiated the pole or tongue L, however the front wheels may be guided, carries the fork support I along in its movement and allows it to swing around the mutual vertical axis. In connection herewith the outer forks of the two Cardan couplings take with their axes an angle, the point of which lies in the above-mentioned vertical axis.

In accordance with the above explained conditions the inner forks must adjust themselves in the straight line which joins the sides of this angle and the length of which is proportional to the size of the angle. For this purpose the movable coupling F G comes into action; the cylindrical part G moves so far into the sleeve F as is necessary, in order that the whole system may be able to take the above-described position. In this manner the second bevel wheel gear H receives a uniform rotary motion from the first bevel wheel gear B, which it transmits to the devices for the next carriage by means of the chain E that runs the whole length of the carriage. At a point N power is transmitted to a chain O which drives a differential gear P, which in turn rotates the back wheels of the carriage either directly (as shown in the drawing) or through the medium of other chains.

The problem of transmitting the rotary motion to the back wheels of any carriage, even when it is turning, having thus been solved, there remain two other conditions to fulfil. The first of these conditions is that, in view of the introduction of concussion springs, the gear carried by the carriage frame shall be made independent of the axles of the wheels which they are intended to drive. This object is effected by the two Oldham couplings M and Q. The coupling M is seated between the bevel wheel gear B and the Cardan coupling C. The gear B is carried by the pole L which is seated on the front wheel axle, while the coupling C and the other mechanical devices are supported by the carriage frame. The engaging of the Oldham coupling renders possible a mutual displacement of the transmission shafts which it connects without interfering with the continuous motion. Thereby the possibility of injury to the actuating and transmission devices when the carriage is loaded or by the spring movements caused by jolts during traveling is entirely excluded. The second Oldham coupling has the same object as the first and is introduced between the wheel for the chain O and the differential gear P. The second condition to fulfil is to give the different carriages a certain degree of independence as well as the possibility of following all elevations or depressions of the ground without hindrance. For this purpose a device is provided which consists of the link K and the king bolt L' of the pole L as well as the Oldham couplings R and M and the action of which will now be described. The pole link K enables the carriage to move up or down in relation to the front part of the frame or fore-carriage of the next carriage, when the train leaves an even road and runs on to a rising or descending road. The Oldham coupling R on the back frame of each carriage between the chain E' of that carriage and the chain A of the following is intended to enable the frames of the two carriages to move relatively to each other, when the front carriage leaves an even road and comes on to a rising or descending road. While the shaft of the back wheel for the chain E' remains stationary the shaft of the front wheel of the chain A slides in the guides of its coupling in the ordinary manner, as will be understood. As the chain A which would have to take up these displacements cannot support them, the axles of the two wheels of the chain A are always kept at a uniform distance apart by rods X and Y.

The Oldham coupling M one function of which has just been explained has a second function, viz., that of enabling two successive carriages to execute torsional movements in relation to each other. When in moving over an elevation or a depression in the ground the front carriage rises or falls on one side, the pole L of the second carriage rigidly connected with the first carriage swings and with it the mechanism which it supports, viz., the chain A and the wheel gear B around the king bolt L'.

The introduction of the wheel of the chain A of each carriage in the axis of the chain E' is effected by means of a kind of disk-coupling S (Fig. 4). The disk T of this coupling can be moved in the direction of its central axis by means of a rope that surrounds it and a screw crank wheel Z. When in making up the train two carriages are to be coupled together the screw bolt W on the back part of the frame of the front carriage is first screwed into the nut W' on the pole of the next carriage. The wheel Z is then turned so that the disk T moves towards the disk T' and finally locking bolts are driven through the disks.

The length of the different poles is proportional to the track width of each carriage, so that the relative track width and length of pole in each carriage represent a constant value for the whole train of carriages. Owing to this arrangement in combination with that of the Cardan gear C D F G on the pivot of the front frame of the carriage, when a bend is made all the carriages of the train follow the same precisely, so that even when a curve is being negotiated no carriage is dragged by the one running in advance of it.

What they claim as their invention and desire to secure by Letters Patent is:—

1. In a traction device, a train of vehicles, each having a pivoted axle, two telescopic members over said pivot having a Cardan joint at their outer ends, bevel gearing connected with each joint, and chains for transmitting power to and from said gearing.

2. In a traction device, a train of vehicles, each having a pivoted axle, and an axle provided with a differential gearing, a flexible coupling over the pivot having bevel gearing at each end, chains for transmitting power to and from said bevel gearing, and a chain for transmitting power to the differential gearing.

3. In a traction device, a train of vehicles, each having a pivoted axle at its forward end, a tongue connected with said axle, a fork support on the tongue, flexible coupling over said pivot, each end of which is provided with bevel gearing and the front end is carried by said support, and chains for transmitting power to and from said gearing, and chains for transmitting power to the traction wheels of the vehicles.

4. In a traction device, a train of vehicles, each of which is provided with a pivoted axle, poles for connecting the vehicles, the poles being of such a length that the relative width of the wheels and the length of the pole of each carriage represent a constant value for the whole train in order that the vehicles of the train may have the same angle of deviation.

5. In a traction device, a train of vehicles, each provided with a pivoted axle, pivoted poles for connecting the vehicles of the train, means for transmitting power to the train, and Oldham couplings in said means.

6. In a traction device, a train of vehicles, poles and rods between the vehicles, the rear ends of the pole and the rods for each vehicle being pivotally supported, means for connecting the forward ends to the preceding vehicle, wheels at the ends of said rods, a chain over said wheels, whereby the wheels and the connections of the poles form a parallelogram so that the chain is enabled to act continuously, and means for transmitting power from each chain to its vehicle.

In testimony whereof we have signed our names in the presence of the subscribing witnesses.

ANGELO DE LUIGI.
CARLO RAMAZZOTTI.

Witnesses:
 RICCARDO LATTES,
 WEND H. SOLOMON.